(12) United States Patent  
Utsunomiya

(10) Patent No.: US 7,916,366 B2
(45) Date of Patent: Mar. 29, 2011

(54) IMAGE FORMING APPARATUS AND IMAGE PROCESSING METHOD THEREFOR

(75) Inventor: Takehito Utsunomiya, Kawasaki (JP)

(73) Assignee: Canon Kabushiki Kaisha (JP)

( * ) Notice: Subject to any disclaimer, the term of this patent is extended or adjusted under 35 U.S.C. 154(b) by 395 days.

(21) Appl. No.: 12/246,717

(22) Filed: Oct. 7, 2008

(65) Prior Publication Data
US 2009/0097083 A1    Apr. 16, 2009

(30) Foreign Application Priority Data
Oct. 10, 2007  (JP) ................................. 2007-264755

(51) Int. Cl.
*H04N 1/04*    (2006.01)
(52) U.S. Cl. ....... 358/518; 358/488; 358/1.12; 358/496; 358/497
(58) Field of Classification Search .................. 358/518, 358/1.12, 488, 496, 497
See application file for complete search history.

(56) References Cited

U.S. PATENT DOCUMENTS

| 5,887,125 A * | 3/1999 | Takano et al. ................ 358/1.12 |
| 6,218,660 B1 * | 4/2001 | Hada ............................. 250/226 |
| 6,219,517 B1 * | 4/2001 | Takahashi et al. ............ 399/301 |

FOREIGN PATENT DOCUMENTS

| JP | 2002-116394 A | 4/2002 |
| JP | 2003-241131 A | 8/2003 |
| JP | 2004-170755 A | 6/2004 |

* cited by examiner

*Primary Examiner* — Houshang Safaipour
(74) *Attorney, Agent, or Firm* — Rossi, Kimms & McDowell LLP

(57) ABSTRACT

An image forming apparatus which is capable of suppressing occurrence of color moire. A second storage unit stores image data associated with at least two colors. A controller reads out the stored color-specific image data while designating a reading position in a sub scanning direction of the image data. A transfer unit transfers a color image onto a recording medium based on the read-out image data of each color. An image processing unit corrects the reading position in the sub scanning direction of the image data of each color according to profile data of each color defined based on position curve information in the main scanning direction of the transfer unit, when the controller reads out the image data. The controller regenerates the profile data if at least two pieces of the profile data satisfy a predetermined condition.

5 Claims, 20 Drawing Sheets

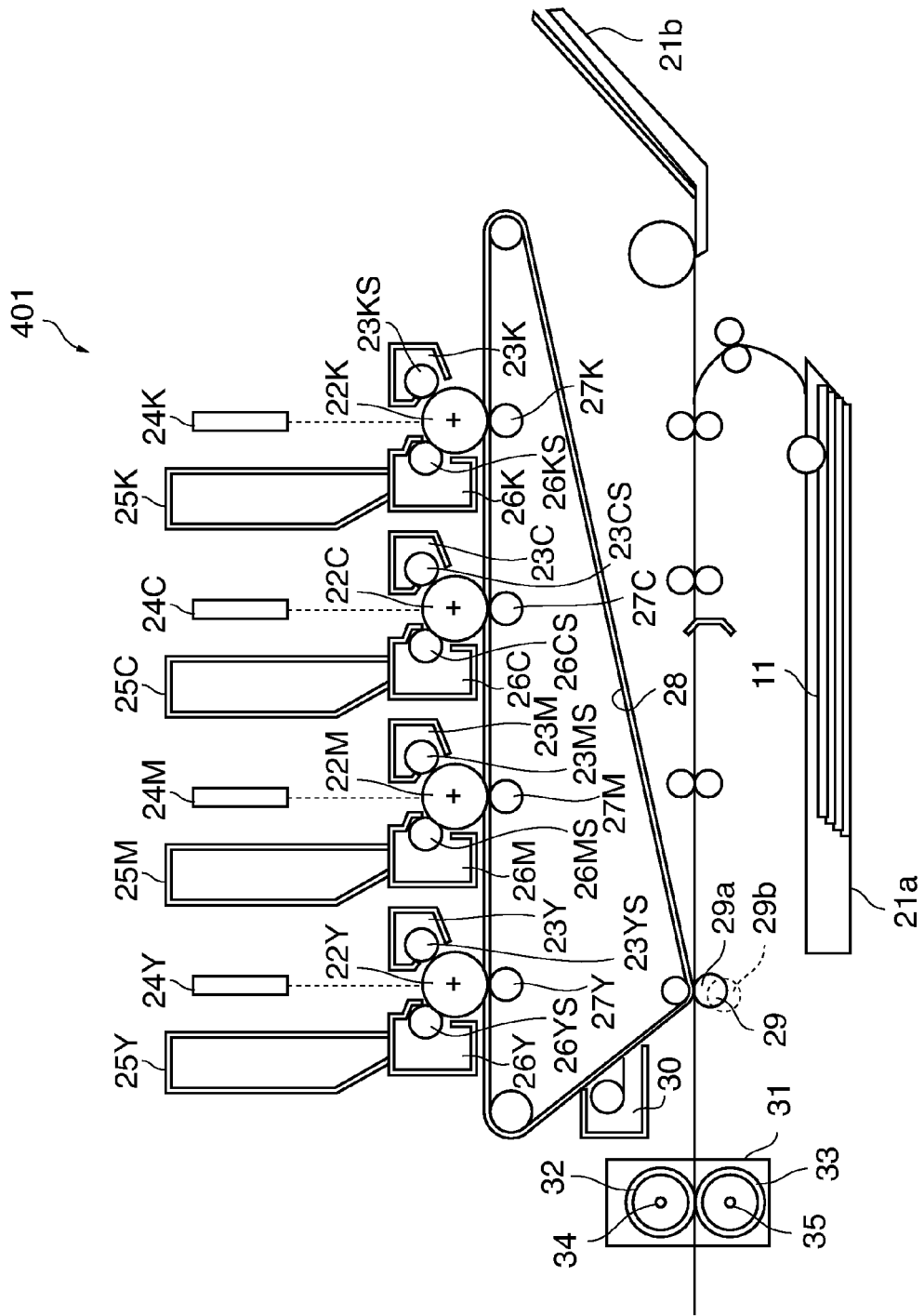

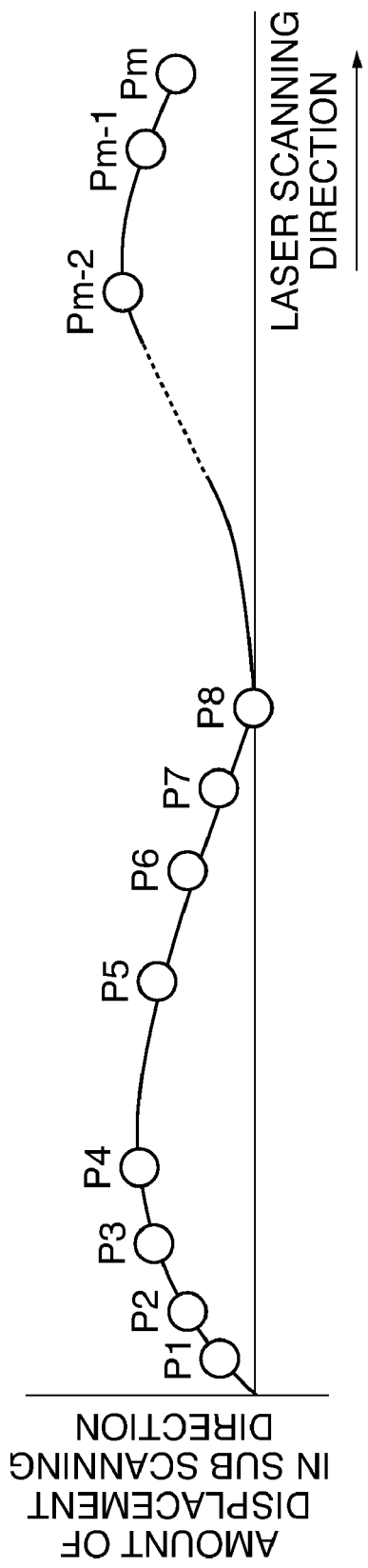

*FIG. 7A*

| MAIN SCANNING PIXEL | 256 | ............ |
|---|---|---|
| PIXEL SHIFT POINT | P1 | ............ |
| DIRECTION | 1 | ............ |

*FIG. 7B*

| MAIN SCANNING PIXEL | 128 | ............ |
|---|---|---|
| PIXEL SHIFT POINT | P1 | ............ |
| DIRECTION | 1 | ............ |

*FIG. 7C*

| MAIN SCANNING PIXEL | 192 | ............ |
|---|---|---|
| PIXEL SHIFT POINT | P1 | ............ |
| DIRECTION | 1 | ............ |

*FIG. 7D*

| MAIN SCANNING PIXEL | 448 | ............ |
|---|---|---|
| PIXEL SHIFT POINT | P1 | ............ |
| DIRECTION | 1 | ............ |

*FIG. 13A*

| MAIN SCANNING PIXEL | 192 | ............ |
|---|---|---|
| PIXEL SHIFT POINT | P1 | ............ |
| DIRECTION | 1 | ............ |

*FIG. 13B*

| MAIN SCANNING PIXEL | 192 | ............ |
|---|---|---|
| PIXEL SHIFT POINT | P1 | ............ |
| DIRECTION | 1 | ............ |

*FIG. 13C*

| MAIN SCANNING PIXEL | 192 | ............ |
|---|---|---|
| PIXEL SHIFT POINT | P1 | ............ |
| DIRECTION | 1 | ............ |

*FIG. 13D*

| MAIN SCANNING PIXEL | 448 | ............ |
|---|---|---|
| PIXEL SHIFT POINT | P1 | ............ |
| DIRECTION | 1 | ............ |

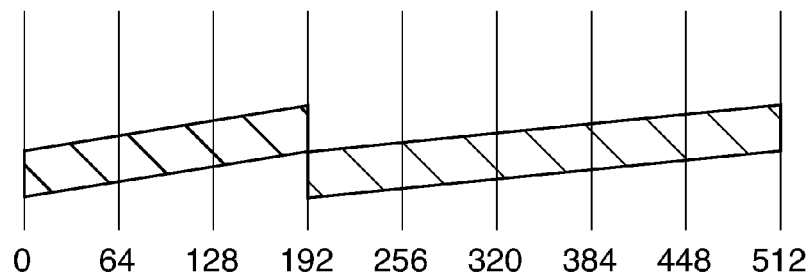
*FIG. 15A*
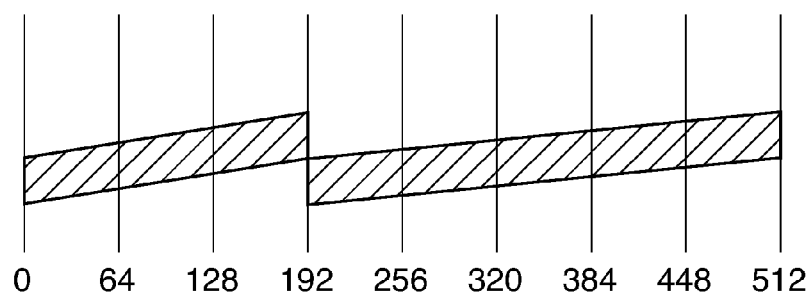
*FIG. 15B*
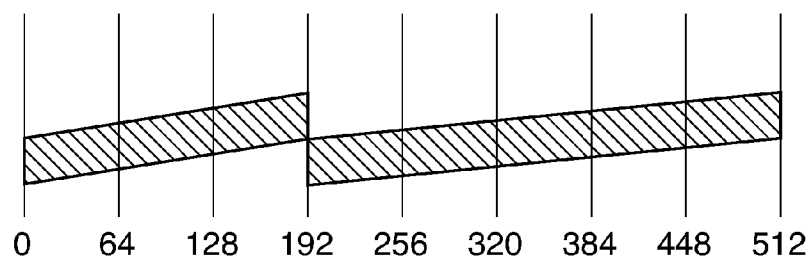
*FIG. 15C*
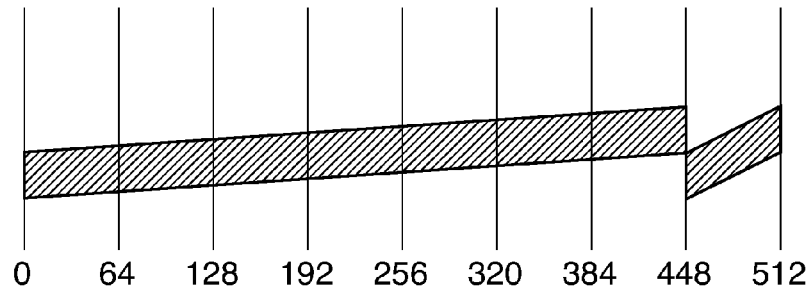
*FIG. 15D*
*FIG. 16*
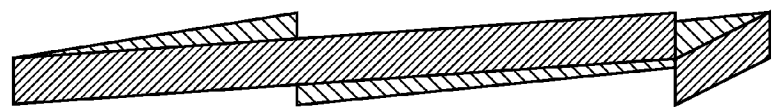

AMOUNT OF TILTING DISPLACEMENT

BITMAP IMAGE (BEFORE GRADATION CORRECTION)

CORRECTED BITMAP IMAGE

BITMAP IMAGE (AFTER GRADATION CORRECTION)

EXPOSURE IMAGE

IMAGE FORMING APPARATUS AND IMAGE PROCESSING METHOD THEREFOR

BACKGROUND OF THE INVENTION

1. Field of the Invention

The present invention relates to an image forming apparatus for forming an image of a plurality of colors on a recording medium and an image processing method therefor.

2. Description of the Related Art

Conventionally, electrophotography has been known as an image recording method used by a color image-forming apparatus, such as a color printer or a color copying machine. In electrophotography, an electrostatic latent image is formed on a photosensitive drum using a laser beam, and then developed by an electrically charged color material (hereinafter referred to as toner). Further, image recording is performed by transferring the developed toner image onto a transfer sheet and fixing the toner image on the sheet.

In recent years, to increase the image forming speed of the color image-forming apparatus using electrophotography, an increasing number of tandem color image-forming apparatuses have come into use which are each provided with developing devices and photosensitive drums both corresponding in number to the number of colors of toner, for sequentially transferring images of different colors onto an image conveyor belt or a recording medium.

It is known that in the color image-forming apparatus of the tandem type, there are a plurality of factors which cause misregistration, and there have been proposed various measures against the factors.

The factors include non-uniformity of a lens of a deflection scanner or misalignment of the mounting positions of the lens in the deflection scanner, and assembly misalignment of the deflection scanner to a color image-forming apparatus. Such misalignments cause scanning lines to be inclined or curved, and the curvature (hereinafter referred to as 'the profile') of each scanning line differs from color to color, which results in misregistration.

The profile differs between image forming apparatuses, i.e. recording engines, and further between colors. FIGS. 17A to 17D are graphs showing examples of profiles characteristic of a conventional image forming apparatus. That is, FIGS. 17A to 17D shows profile characteristics of respective colors, cyan (C), magenta (M), yellow (Y), and black (K). The vertical axis of each graph represents the amount of displacement in the sub scanning direction with respect to an ideal characteristic in the image forming apparatus, while the horizontal axis represents the position in the main scanning direction in the image forming apparatus.

Lines 201, 203, 205, and 207 linearly extending in the main scanning direction represent an ideal characteristic without a curve. On the other hand, curved lines 202, 204, 206, and 208 represent color-specific profile characteristics. More specifically, the profile characteristic of cyan is represented by the line 202. The profile characteristic of magenta is represented by the line 204. The profile characteristic of yellow is represented by the line 206. The profile characteristic of black is represented by the line 208.

As can be understood from FIGS. 17A to 17D, the lines 201, 203, 205, and 207 curve differently, and the differences in curve shape between the colors appear as misregistration in image data after fixing.

As a measure to cope with the misregistration, there has been proposed a method in Japanese Patent Laid-Open Publication No. 2002-116394, in which during the process of assembly of a deflection scanner, the degree of curvature of a scanning line is measured using an optical sensor, and is adjusted by mechanically rotating a lens, and then the lens is fixed by an adhesive.

Further, in Japanese Patent Laid-Open Publication No. 2003-241131, there has been disclosed a method in which during the process of mounting a deflection scanner in the body of an image forming apparatus, the degree of inclination of a scanning line is measured using an optical sensor, and is adjusted by mechanically tilting the deflection scanner, and then the deflection scanner is assembled to the body of the image forming apparatus.

Furthermore, in Japanese Patent Laid-Open Publication No. 2004-170755, there has been proposed a method in which after the inclination and curvature of a scanning line are measured using an optical sensor, bitmap image data is corrected such that the inclination and curvature of the scanning line can be cancelled out, and then the corrected image is formed. In this method, correction is performed by processing image data using software, so that it is possible to dispense with members for mechanical adjustment, and no adjustment process is required to be carried out during assembly. This makes it possible to reduce the size of a color image-forming apparatus and cope with misregistration at a lower cost than by the methods disclosed in Japanese Patent Laid-Open Publications No. 2002-116394 and No. 2003-241131.

The misregistration correction by data processing using software is categorized into pixel-by-pixel correction and less-than-pixel correction. FIGS. 18A to 18C are diagrams useful in explaining the pixel-by-pixel correction. In the pixel-by-pixel correction, pixels are offset in the sub scanning direction on a pixel-by-pixel basis according to the amount of correction of the inclination and curvature of the scanning line. It should be noted that a position from which pixels are offset is hereinafter referred to as "a pixel shift point". In FIGS. 18A to 18C, each of positions P1 to P5 corresponds to a pixel shift point.

FIGS. 19A to 19E are diagrams useful in explaining the less-than-pixel correction. In the less-than pixel correction, each of the gradation values of bitmap image data is adjusted by adjacent pixels in the sub scanning direction. More specifically, when the scanning line is curved upward due to a profile characteristic shown in FIG. 19A, bitmap image data yet to be subjected to gradation correction is processed in a manner shifted in a direction opposite to a direction shown by the profile characteristic with respect to the sub scanning direction. The correction in an amount of less than one pixel (less-than-pixel correction) is performed by this method, whereby unnatural steps produced by the pixel-by-pixel correction at a pixel shift point as a boundary can be eliminated to thereby smooth the image.

However, in the above-described conventional image forming apparatus, even after correction is performed based on pixel shift points for each color, there is a fear that color moire might cause degradation of image quality in an image visualized after image formation in a case where color-specific pixel shift points are close to each other.

SUMMARY OF THE INVENTION

The present invention provides an image forming apparatus which is capable of suppressing occurrence of color moire due to correction of misregistration between colors, and an image processing method therefor.

In a first aspect of the present invention, there is provided an image forming apparatus comprising an image storage unit adapted to store image data associated with at least two colors, a reading unit adapted to read out the stored image data of each color while designating a reading position in a sub scanning direction of the image data, a transfer unit adapted to transfer a color image onto a recording medium based on the read-out image data of each color, a correction unit adapted to correct the reading position in the sub scanning direction of the image data of each color according to curve correction information of each color defined based on position curve information in a main scanning direction of the transfer unit, when the reading unit reads out the image data, and a curve correction information regeneration unit adapted to regenerate the curve correction information in a case where at least two pieces of the curve correction information of respective colors satisfy a predetermined condition.

In a second aspect of the present invention, there is provided an image forming method for an image forming apparatus including an image storage unit adapted to store image data associated with at least two colors, a reading unit adapted to read out the stored image data of each color while designating a reading position in the sub scanning direction of the image data, and a transfer unit adapted to transfer a color image onto a recording medium based on the read-out image data of each color, comprising correcting the reading position in the sub scanning direction of the image data of each color according to curve correction information of each color defined based on position curve information in a main scanning direction of the transfer unit, when the reading unit reads out the image data, and regenerating the curve correction information in a case where at least two pieces of the curve correction information of respective colors satisfy a predetermined condition.

According to the present invention, when the predetermined condition is satisfied, curve correction information is regenerated, so that the occurrence of color moire due to correction of misregistration between colors can be suppressed, which makes it possible to prevent degradation of image quality due to color moire or the like.

The features and advantages of the invention will become more apparent from the following detailed description taken in conjunction with the accompanying drawings.

BRIEF DESCRIPTION OF THE DRAWINGS

FIG. 2 is a schematic cross-sectional view of an image forming unit of the color image-forming apparatus.

FIGS. 5A and 5B are diagrams showing a manner of distortion of a laser scanner for one color and profile data associated therewith.

FIGS. 7A to 7D are diagrams showing color-specific profile data stored in a profile storage unit within the image forming apparatus.

FIGS. 13A to 13D are diagrams showing regenerated profile data.

FIGS. 15A to 15D are diagrams showing states of laser scanning performed by the image forming unit of the image forming apparatus based on the read-out data of colors shown in FIGS. 14A to 14D.

FIG. 16 is a view showing a state of an image formed on a sheet.

DETAILED DESCRIPTION OF THE EMBODIMENTS

The present invention will now be described in detail below with reference to the accompanying drawings showing embodiments thereof. An image forming apparatus according to the present embodiment is applied to an electrophotographic color image-forming apparatus.

Figure 1A:
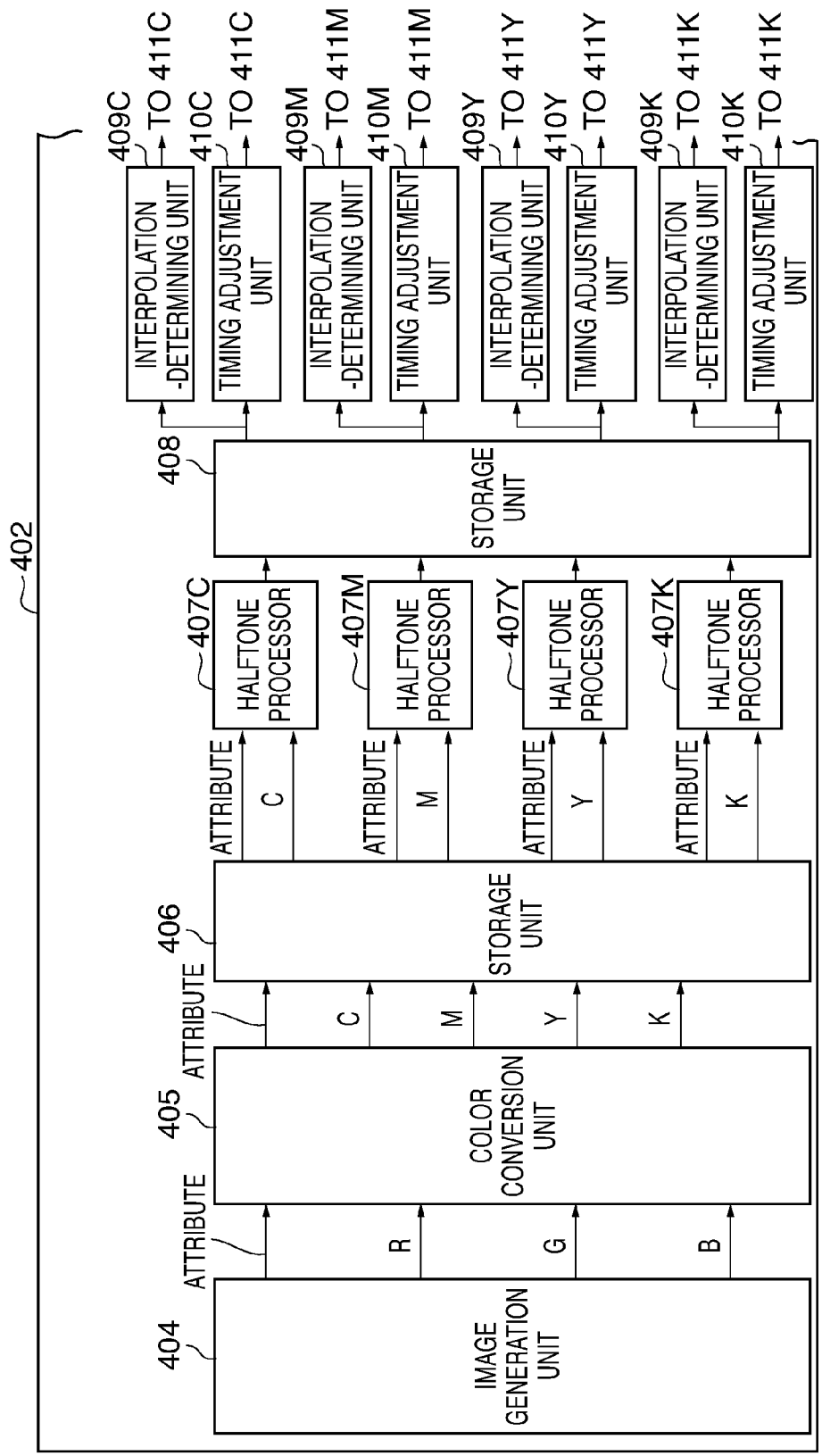
FIGS. 1A and 1B are block diagrams of a color image-forming apparatus according to an embodiment of the present invention.
Figure 1B:
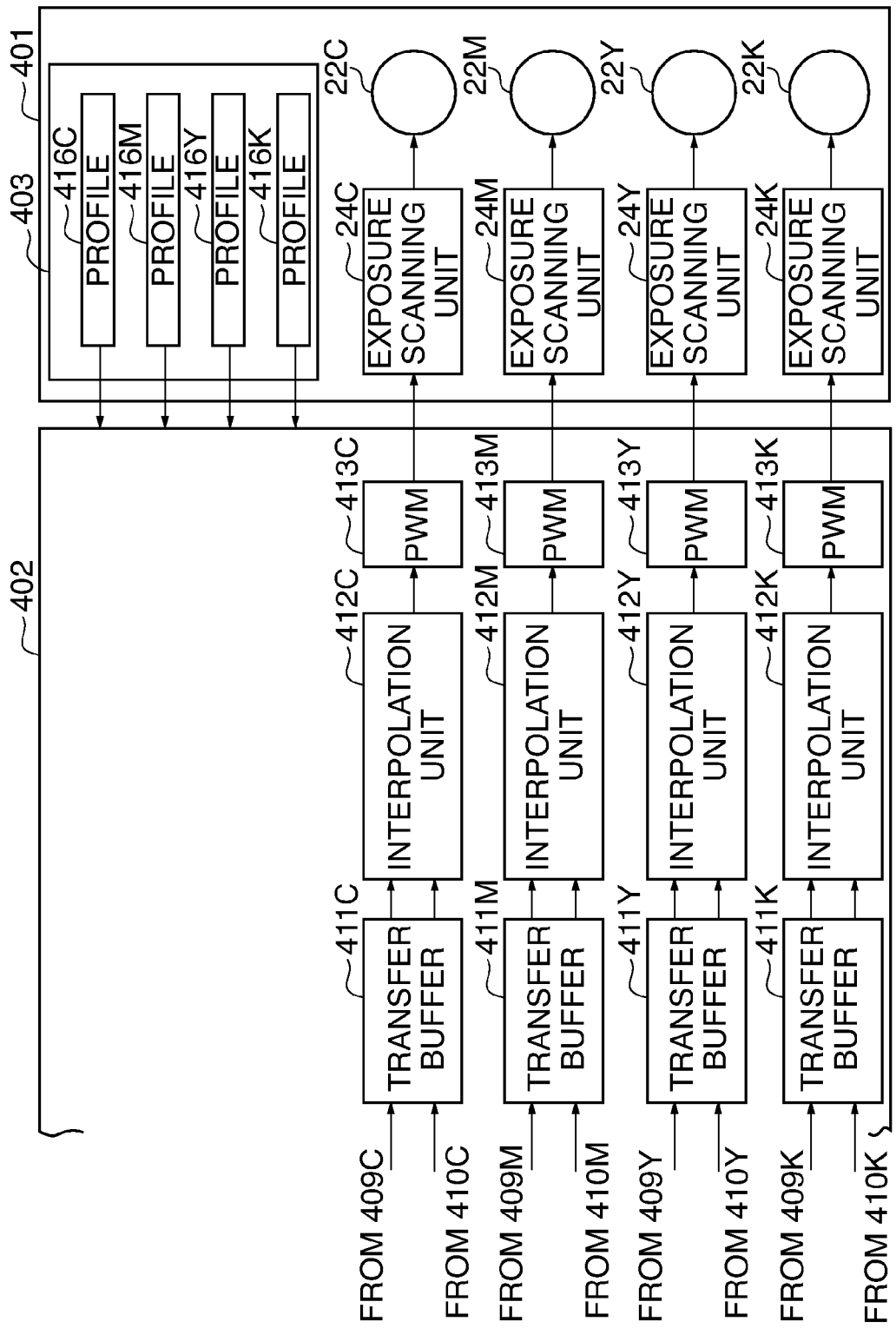

FIGS. 1A and 1B are block diagrams of a color image-forming apparatus according to the embodiment of the present invention. FIGS. 1A and 1B mainly show functional blocks associated with operations for forming electrostatic latent images. The color image-forming apparatus is comprised of an image forming unit 401 and an image processing unit 402. The image processing unit 402 generates bitmap image information. The image forming unit 401 forms an image on a recording medium based on the bitmap image information generated by the image processing unit 402. It should be noted that the image forming unit 401 includes a profile storage unit (curve correction information storage unit) 403 for storing profile data 416C, 416M, 416Y, and 416K (curve correction information) of the respective four colors of cyan (C), magenta (M), yellow (Y), and black (K), as described in detail hereinafter.

FIG. 2 is a schematic cross-sectional view of the image forming unit 401 of the color image-forming apparatus. In the present embodiment, a tandem color image-forming apparatus employing an intermediate transfer member is used as an example of the electrophotographic color image-forming apparatus.

The image forming unit 401 emits exposure light on a color-by-color basis according to exposure time periods calculated by the image processing unit 402, to thereby form electrostatic latent images on respective color-specific photosensitive bodies, and develops each of the electrostatic latent images into a single-color toner image. Further, the image forming unit 401 superimposes the single-color toner images one upon another to form a multicolor toner image. Then, the image forming unit 401 transfers the multicolor toner image onto a recording medium 11 and fixes the multicolor toner image on the same. The image forming unit 401 is mainly comprised of an electrostatic charger unit, an exposure unit, a developing unit, a transfer unit, and a fixing unit.

The electrostatic charger unit includes four primary electrostatic chargers 23Y, 23M, 23C, and 23K, provided for the respective colors of Y (yellow), M (magenta), C (cyan), and K (black), for electrostatically charging the respective photosensitive bodies 22Y, 22M, 22C, and 22K. The primary electrostatic chargers 23Y, 23M, 23C, and 23K are provided with respective sleeves 23YS, 23MS, 23CS, and 23KS.

Each of the photosensitive bodies 22Y, 22M, 22C, and 22K is driven for rotation by a driving force of a drive motor (not shown). The drive motor rotates each of the photosensitive bodies 22Y, 22M, 22C, and 22K in a counterclockwise direction, as viewed in FIG. 2, in accordance with image forming operation.

The exposure unit irradiates the photosensitive bodies 22Y, 22M, 22C, and 22K with exposure light emitted from exposure scanning units (laser scanners) 24Y, 24M, 24C, and 24K to selectively expose the surfaces of the respective photosensitive bodies 22Y, 22M, 22C, and 22K, thereby forming electrostatic latent images on the respective surfaces.

The developing unit includes four developing devices 26Y, 26M, 26C, and 26K for carrying out developing operations associated with the respective colors Y, M, C, and K so as to visualize the above-mentioned color-specific electrostatic latent images. The developing devices are provided with respective sleeves 26YS, 26MS, 26CS, and 26KS. It should be noted that the developing devices 26Y, 26M, 26C, and 26K are removable.

The transfer unit rotates the intermediate transfer member 28 in a clockwise direction, as viewed in FIG. 2, so as to transfer single-color toner images from the photosensitive bodies 22 (22Y, 22M, 22C, 22K) onto the intermediate transfer member 28. The transfer unit transfers each single-color toner image in accordance with rotation of an associated one of the photosensitive bodies 22Y, 22M, 22C, and 22K and rotation of an associated one of primary transfer rollers 27Y, 27M, 27C, and 27K opposed to the respective photosensitive bodies 22Y, 22M, 22C, and 22K. The transfer unit applies a suitable bias voltage to each primary transfer roller 27 (27Y, 27M, 27C, 27K), and at the same time produces a difference in rotational speed between each photosensitive body 22 and the intermediate transfer member 28, to thereby transfer each single-color toner image onto the intermediate transfer member 28 with high efficiency. This operation is referred to as "primary transfer".

Further, the transfer unit transfers single-color toner images onto the intermediate transfer member 28 at respective stations such that the single-color toner images are superimposed one upon the other to form a multicolor toner image, and then conveys the multicolor toner image to a secondary transfer roller 29 in accordance with rotation of the intermediate transfer member 28. Further, the transfer unit conveys a recording medium (sheet) 11 from a feed tray 21*a* or 21*b* to the secondary transfer roller 29, and transfers the multicolor toner image from the intermediate transfer member 28 onto the recording medium 11. The transfer unit applies a suitable bias voltage to the secondary transfer roller 29 to thereby electrostatically transfer the multicolor toner image. This operation is referred to as "secondary transfer". The secondary transfer roller 29 is held in a position 29*a* for contact with the recording medium 11 during transfer of the multicolor toner image onto the recording medium 11, and moves away from the recording medium 11 to a position 29*b* after completion of the secondary transfer operation.

The fixing device (fixing unit) 31 is comprised of a fixing roller 32 for heating the recording medium 11 so as to fuse the multicolor toner image transferred onto the recording medium 11 and fix the same thereon, and a pressure roller 33 for bringing the recording medium 11 into pressure contact with the fixing roller 32. The fixing roller 32 and the pressure roller 33 are formed to have a hollow cylindrical shape, and have respective heaters 34 and 35 disposed therein. The fixing device 31 conveys the recording medium 11 holding the multicolor toner image, by the fixing roller 32 and the pressure roller 33, while applying heat and pressure to the recording medium 11, to thereby fix toner on the same. Thereafter, the recording medium 11 having the toner fixed thereon is discharged onto a discharge tray (not shown) by a discharge roller (not shown). This completes the image forming operation.

A cleaning unit 30 is configured to clean toner remaining on the intermediate transfer member 28. The waste toner remaining on the intermediate transfer member 28 after transfer of the multicolor toner image, i.e. four-color image formed on the intermediate transfer member 28 onto the recording medium 11 is stored in a cleaner container.

Figure 3A:
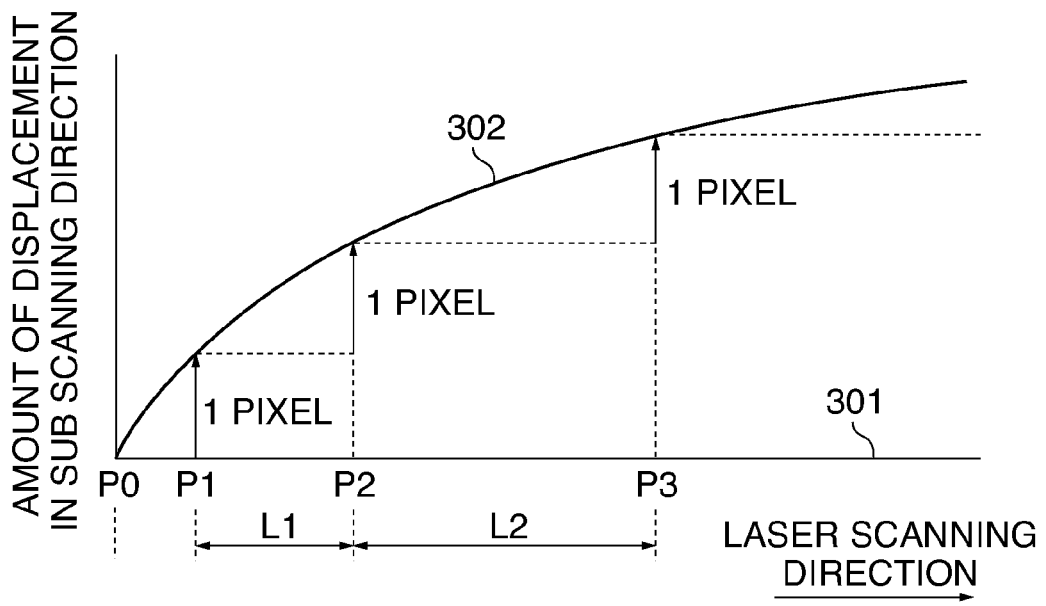
FIGS. 3A and 3B are graphs showing uncorrected profile characteristics of the image forming unit of the image forming apparatus.
Figure 3B:
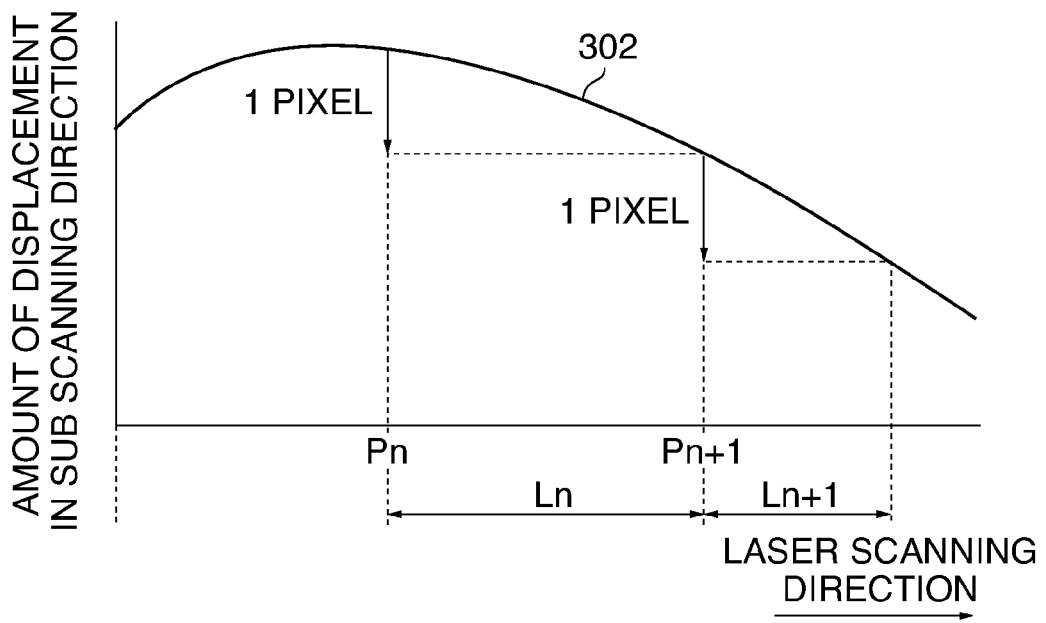

Now, a description will be given of color-specific profile characteristics of the scanning line in the image forming unit 401 of the image forming apparatus. FIGS. 3A and 3B are graphs showing the profile characteristics of the scanning line in the image forming unit 401 of the image forming apparatus. FIG. 3A shows, as a profile characteristic of the scanning line of the image forming unit 401, a region along the laser-scanning direction where the irradiating position of the scanning line is displaced upward. FIG. 3B shows, as a profile characteristic of the scanning line of the image forming unit 401, a region where the irradiating position of the scanning line is displaced downward. Reference numeral 301 denotes a characteristic of an ideal scanning line obtained when scanning is performed perpendicular to the direction of rotation of the photosensitive body 22. On the other hand, reference numeral 302 denotes a characteristic of actual scanning line obtained when the scanning line is tilted and curved due to the positional inaccuracy or diametrical misalignment of photosensitive body 22 and the positional inaccuracy of the optical system of the color-specific exposure scanning unit 24 (24C, 24M, 24Y, or 24K) associated with the photosensitive body 22.

Figure 4A:
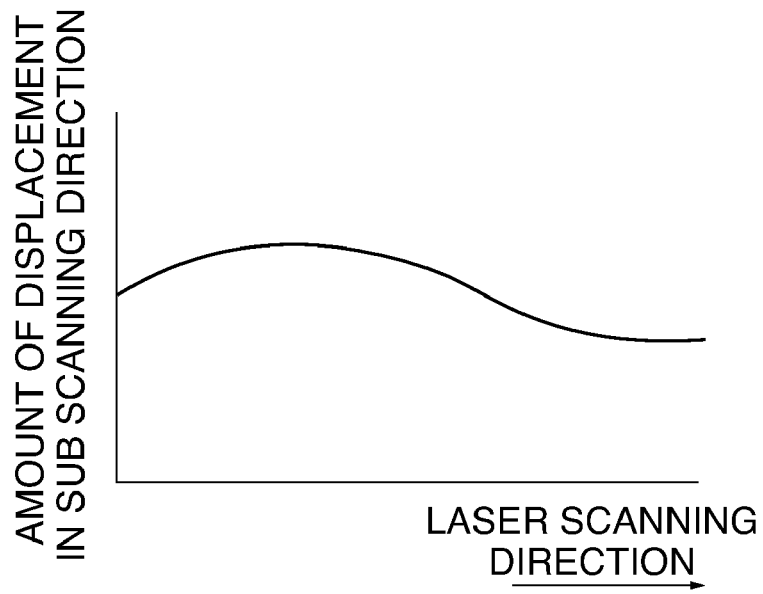
FIGS. 4A to 4D are diagrams useful in explaining the correlation between an uncorrected profile characteristic of the image forming unit, which includes displacement to be corrected by the image processing unit, and a profile characteristic of the image forming unit, which has been corrected by a definition.
Figure 4B:
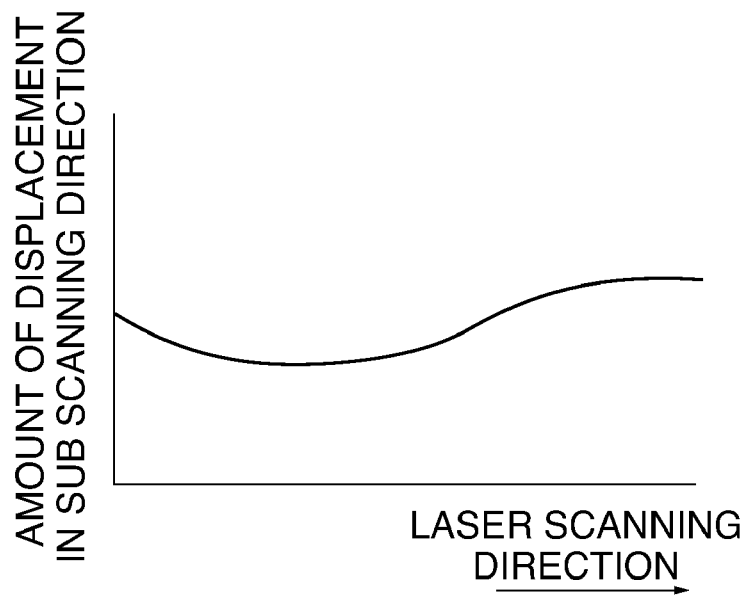
Figure 4C:
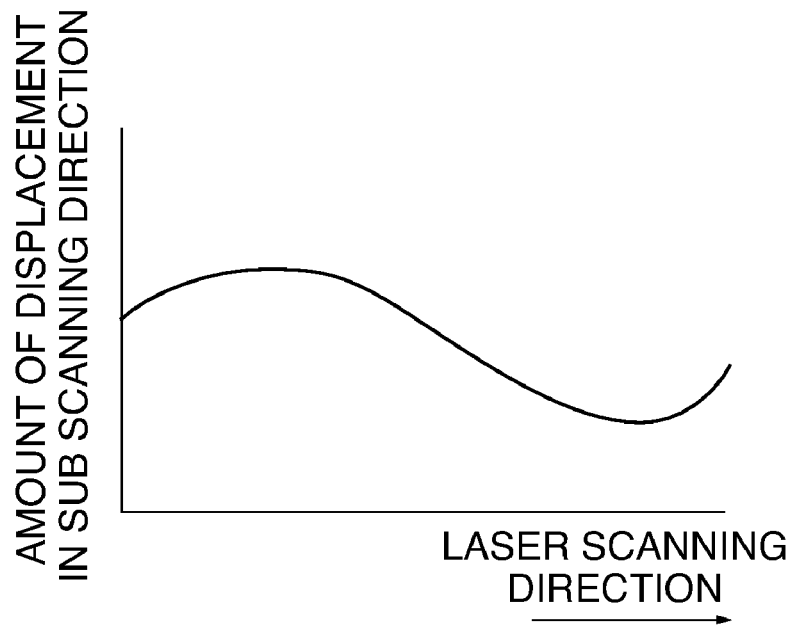
Figure 4D:
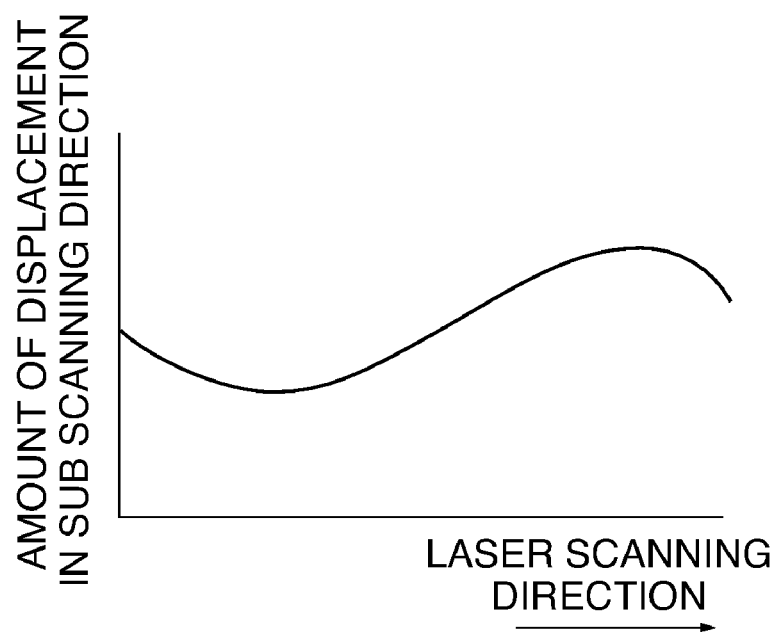

FIGS. 4A to 4D are diagrams useful in explaining the correlation between an uncorrected profile characteristic of the image forming unit 401, which includes displacement to be corrected by the image processing unit 402, and profile data defining correction of the displacement. When the uncorrected profile characteristic of the image forming unit 401, which includes displacement to be corrected by the image processing unit 402, is one shown in FIG. 4A, profile data (corresponding to curve correction information) stored in the image forming unit 401 is formed, as shown in FIG. 4B, so as to cancel out the displacement in FIG. 4A. The image processing unit 402 reads out image data according to the profile data and performs laser-scan processing on the image data, whereby deformation or displacement of an associated image caused by the image forming unit 401 is canceled out, and then the image is printed out. Similarly, when the uncorrected profile characteristic of the image forming unit 401 is one shown in FIG. 4C, profile data stored in the image forming unit 401 is as shown in FIG. 4D. The image processing unit 402 reads out image data according to the profile data and performs laser-scan processing on the image data, whereby deformation or displacement of an associated image to be caused by the image forming unit 401 is corrected.

The profile data can be stored in the form of a table defining a pixel position of each pixel shift point in the main scanning direction and a direction of shift from one pixel shift point to a next one (a forward shift in the sub scanning direction is defined by 1, and a backward shift in the sub scanning direction is defined by 0) as shown in FIGS. 5A and 5B.

FIGS. 5A and 5B are diagrams showing degrees of distortion of a laser scanner for one color and profile data associated therewith. This profile data corresponds to profile data 416C, 416M, 416Y, or 416K stored in the profile storage unit 403 of the image forming apparatus. The profile data describes pixels in the main scanning direction indicative of the positions of respective pixel shift points and 1-bit data indicating an upward or downward direction (forward or backward direction in the sub scanning direction) in which the pixel at each position is to be corrected.

Specifically, the pixel shift points P1, P2, P3, . . . , Pm are defined for the profile characteristic in FIG. 5A. Each of the pixel shift points is defined as a point where the displacement amounts to one pixel in the sub scanning direction. The direction of shift includes an upward direction (forward direction in the sub scanning direction) in which pixels up to a next pixel shift point are shifted and a downward direction (backward direction in the sub scanning direction) in which pixels up to a next pixel shift point are shifted.

For example, the pixel shift point P2 is a point from which pixels up to the next pixel shift point P3 are to be shifted upward. Therefore, the direction of a pixel shift at the pixel shift point P2 is upward. Similarly, the direction of a pixel shift at the pixel shift point P3 is set to be upward, which is held up to the next pixel shift point P4. The direction of a pixel shift at the pixel shift point P4 is downward differently from the preceding pixel shifts. The directions of pixel shifts are only required to be represented in data such the upward direction is indicated by 1 and the downward direction is by 0, as shown in a lowest row in FIG. 5B. In this case, the number of data items to be stored for the purpose of indicating details of correction of a profile characteristic except for data items defining the pixel shift points is equal to the number of the pixel shift points, and hence when the number of the pixel shift points is equal to m, the number of bits to be stored for the above-mentioned purpose is also equal to m.

Image forming apparatuses have different profile characteristics on an apparatus-by-apparatus basis (i.e. according to printing hardware). Further, when an image forming apparatus is a color one, the profile characteristics differ from color to color.

A description will be given of pixel shift points in a region along the laser-scanning direction where upward displacement occurs, with reference to FIG. 3A. In the present embodiment, the pixel shift point corresponds to a point where the displacement amounts to one pixel in the sub scanning direction. More specifically, in FIG. 3A, on the scanning line 302 having an upwardly-curved characteristic, points P1, P2, and P3 at each of which the displacement in the sub scanning direction amounts to one pixel corresponds to respective pixel shift points. It should be noted that in FIG. 3A, displacements are defined with reference to a point P0. As is apparent from FIG. 3A, the distance (L1, L2) between adjacent pixel shift points is shorter in a region where the scanning line 302 having the curved characteristic changes steeply, and is longer in a region where the scanning line 302 changes gently.

Next, a description will be given of pixel shift points in a region along the laser-scanning direction where downward displacement occurs, with reference to FIG. 3B. In this region as well, the pixel shift point corresponds to a point where the displacement amounts to one pixel in the sub scanning direction. More specifically, in FIG. 3B, on the scanning line 302 having an downwardly-curved characteristic, points Pn and Pn+1 at each of which the displacement in the sub scanning direction amounts to one pixel corresponds to respective pixel shift points. In FIG. 3B as well, the distance (Ln, Ln+1) between adjacent pixel shift points is shorter in a region where the scanning line 302 having the curved characteristic changes steeply, and is longer in a region where the scanning line 302 changes gently.

Thus, the pixel shift points are closely related to the degree of change of the scanning line 302, which has a curved characteristic, of an image forming apparatus. Therefore, an image forming apparatus having a curved characteristic with steeper change has more pixel shift points, whereas an image forming apparatus having a curved characteristic with gentler change has fewer pixel shift points.

As described hereinbefore, the scanning line curved characteristic of an image forming apparatus differs from color to color as well, and hence the number of pixel shift points and the positions of the respective pixel shift points differ from color to color. The differences between colors appear as misregistration on an image formed by transferring a full-color toner image onto the intermediate transfer member 28.

Next, a description will be given of the configuration and operation of the image forming unit 402 of the color image-forming apparatus (see FIGS. 1A and 1B). An image generation unit 404 generates printable raster image data using print data received from a computer (not shown) or the like, and outputs the generated image data on a pixel-by-pixel basis, as RGB data and attribute data indicative of data attributes of respective pixels.

It should be noted that the image generation unit 404 may be configured to use not image data received from the computer or the like, but image data from a reader unit provided in the color image-forming apparatus. The reader unit includes at least a CCD (Charged Couple Device) or a CIS (Contact Image Sensor). In this case, the reader unit may be provided with a processor unit for performing predetermined image processing on read image data. Alternatively, the color image-forming apparatus may be configured not to have a reader unit, but to be capable of receiving data from an external reader device via an interface (not shown).

A color conversion unit 405 converts the RGB data into CMYK data according to the toner colors provided in the image forming unit 401, and then stores the CMYK data and attribute data in a bitmap memory (storage unit) 406.

The storage unit 406 serves as a first storage unit provided in the image processing unit 402, and temporarily stores raster image data to be subjected to print processing. It should be noted that the storage unit 406 may be formed as a page memory for storing image data of an amount corresponding to one page, or as a band memory for storing data of an amount corresponding to a plurality of lines.

Halftone processors 407C, 407M, 407Y, and 407K perform halftone processing on attribute data and color-specific data output from the storage unit 406. As a halftone processor, examples are known which are configured to perform screen processing or error diffusion processing. In the screen processing, N-arization is performed using predetermined dither matrices and input image data. On the other hand, in the error diffusion processing, N-arization is performed by comparing input image data with a predetermined threshold value, and the differences between the input image data and the threshold value are diffused into surrounding pixels to be subjected to N-arization later.

A second storage unit 408 (corresponding to an image storage unit) is provided in the image forming apparatus, and stores N-ary data processed by the halftone processors 407 (407C, 407M, 407Y, and 407K). It should be noted that when the position of a pixel to be subjected to image processing in the units downstream of the second storage unit 408 is a pixel shift point, pixel shift by one pixel is performed according to an instruction at a time point when the pixel is read out from the second storage unit 408. This pixel shift by one pixel corresponds to reading position correction.

Figure 6A:
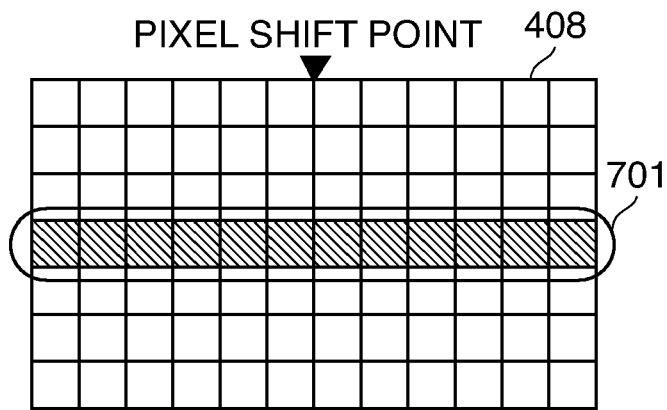
FIGS. 6A to 6C are diagrams useful in explaining reading at a pixel shift point.
Figure 6B:
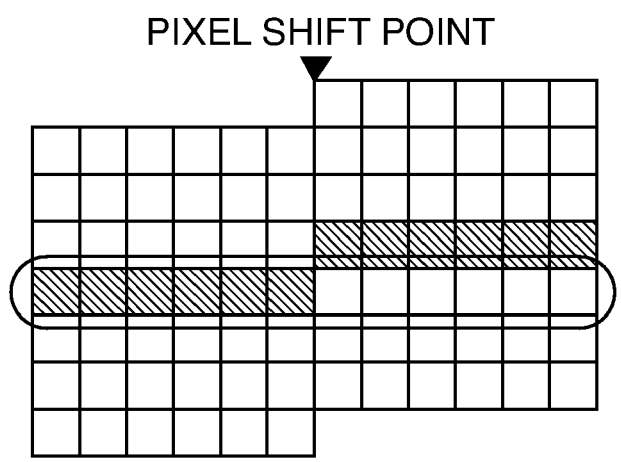
Figure 6C:
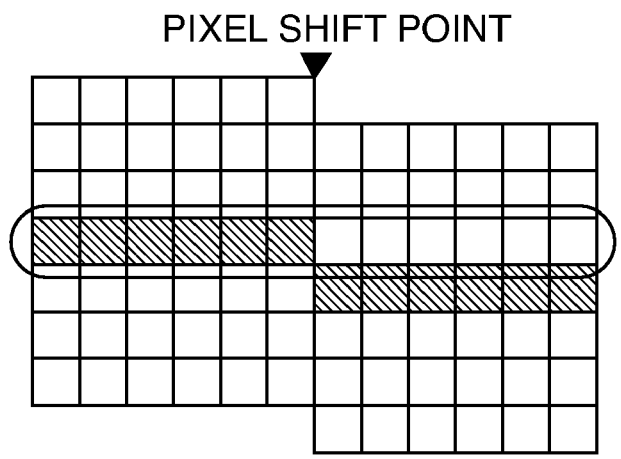
Figure 8A:
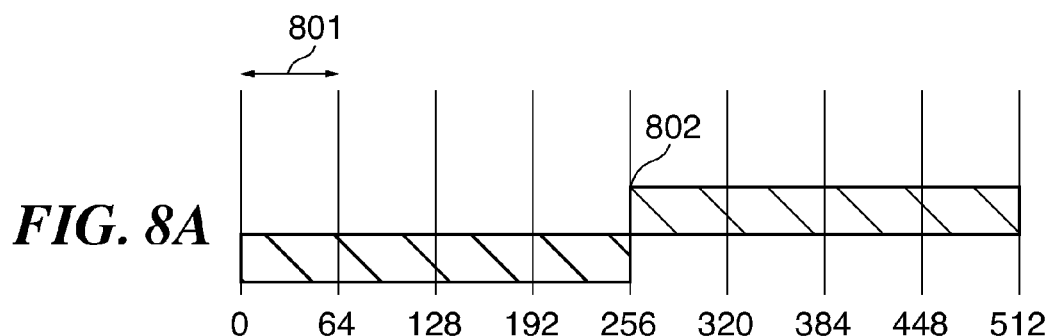
FIGS. 8A to 8D are diagrams useful in explaining how data of colors are read from a second storage unit (image memory) of the image forming apparatus which stores data of colors, according to the profile data shown in FIGS. 7A to 7D.
Figure 8B:
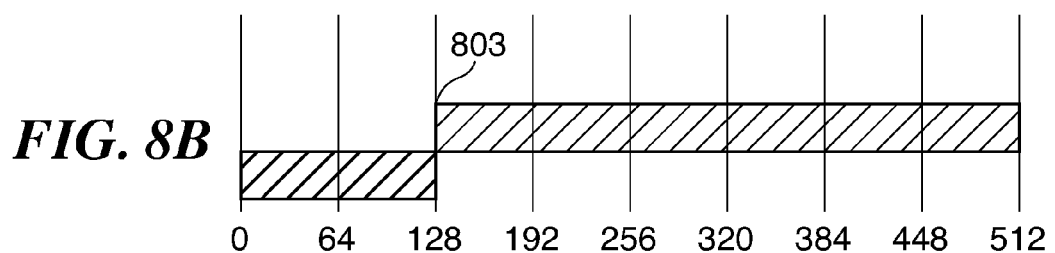
Figure 8C:
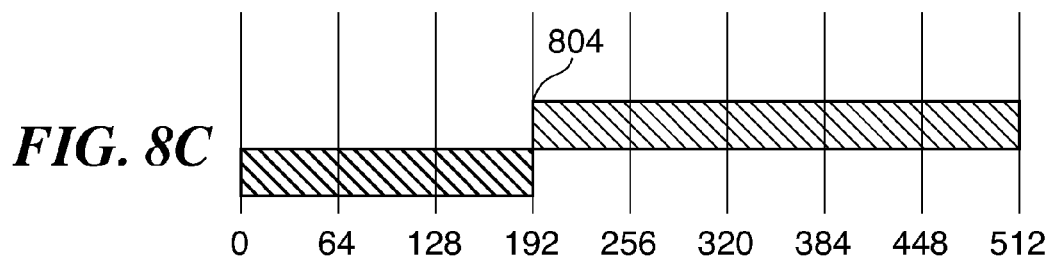
Figure 8D:
Figure 9A:
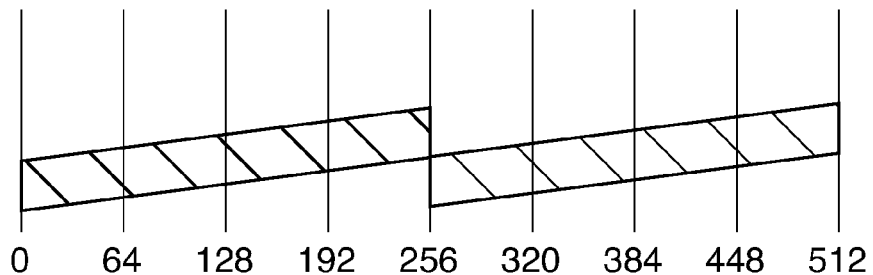
FIGS. 9A to 9D are diagrams showing states of laser scanning performed by the image forming unit of the image forming apparatus based on the read-out data of colors shown in FIGS. 8A to 8D.
Figure 9B:
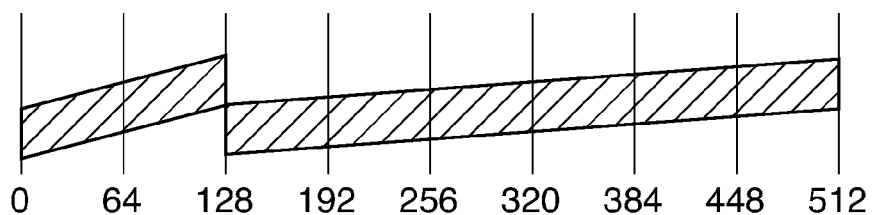
Figure 9C:
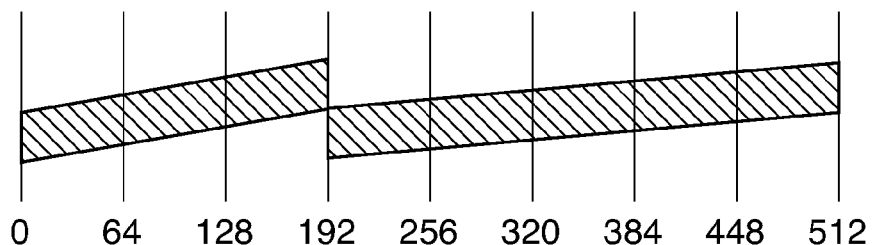
Figure 9D:
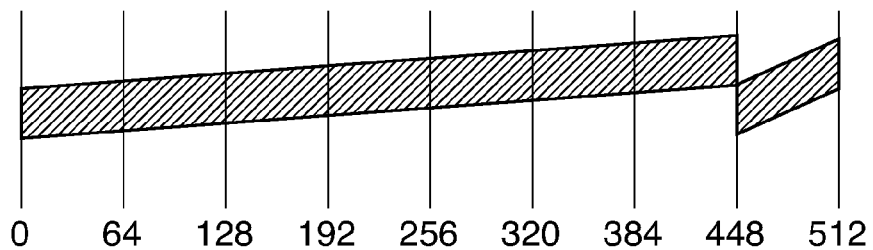

FIGS. 6A to 6C are diagrams useful in explaining reading at a pixel shift point. FIG. 6A schematically shows the state of data stored in the second storage unit 408. As shown in FIG. 6A, the second storage unit 408 stores data processed by the halftone processors 407 and not dependent on correction by the image processing unit 402 or the scanning line curved characteristic of the image forming unit 401, that is, data before being corrected based on profile data associated with the scanning line curved characteristic.

In a case where at a time point of reading out a line 701 appearing in FIG. 6A, profile data stored in the image forming unit 401 specifies a pixel shift point for a downward shift (backward shift in the sub scanning direction) so as to correct an upward displacement (forward displacement in the sub scanning direction) of the profile of the scanning line of the image forming unit 401, data one pixel upward (forward in the sub scanning direction) of the data stored in the second storage unit 408 is read out with the pixel shift point as a boundary, as shown in FIG. 6B. As a consequence, printout is performed in a state shifted downward by one pixel (i.e. with one-line shift backward in the sub scanning direction), which corrects the upward displacement of the scanning line.

On the other hand, in a case where at a time point of reading out the line 701 appearing in FIG. 6A, profile data stored in the image forming unit 401 specifies a pixel shift point for upward shift (forward shift in the sub scanning direction) so as to correct an downward shift (backward shift in the sub scanning direction) of the profile of the image forming unit 401, data one pixel downward (backward in the sub scanning direction) of the data stored in the second storage unit 408 is read out with the pixel shift point as a boundary, as shown in FIG. 6C. As a consequence, printout is performed in a state shifted upward by one pixel (i.e. with one-line shift forward in the sub scanning direction), which corrects the downward displacement of the scanning line.

Each of color-specific interpolation-determining units 409C, 409M, 409Y, and 409K determines whether or not interpolation is necessitated in post-processing as processing to be performed on pixels of input N-ary data before and after a pixel shift point.

Each of timing adjustment units 410C, 410M, 410Y, and 410K is provided to achieve synchronization between the N-ary data input from the second storage unit 408 and a result of the determination by the associated interpolation-determining unit 409. Each of transfer buffers 411C, 411M, 411Y, and 411K temporarily stores output data from the associated interpolation-determining unit 409 and the associated timing adjustment unit 410. It should be noted that although in the present embodiment, the first storage unit 406, the second storage unit 408, and the transfer buffers 411 are separately provided, these may be formed as a common storage unit in the image forming apparatus.

Each of interpolation units 412C, 412M, 412Y, and 412K performs interpolation on receive data received from an associated one of the transfer buffers 411C, 411M, 411Y, and 411K, based on a result of the determination by the associated interpolation-determining unit 409, which is also transferred via the associated transfer buffer. Determination by each interpolation-determining unit 409 is made in association with each pixel, whereas in interpolation by each interpolation unit 412, only pixels before and after a pixel shift point corresponding to the curved characteristic in the image forming apparatus are used.

FIGS. 7A to 7D are diagrams showing color-specific profile data stored in the profile storage unit 403. FIG. 7A shows profile data of a cyan (C) plane requiring upward pixel shift at a 256th pixel in the main scanning direction. FIG. 7B shows profile data of a magenta (M) plane requiring upward pixel shift at a 128th pixel in the main scanning direction. FIG. 7C shows profile data of a yellow (Y) plane requiring upward pixel shift of a 192nd pixel. FIG. 7D shows profile data of a black (K) plane requiring upward pixel shift at a 448th pixel.

Figure 10:
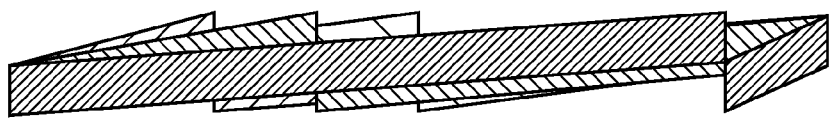
FIG. 10 is a view showing a state of an image formed on a sheet.

FIGS. 8A to 8D are diagrams useful in explaining how data of colors are read from the second storage unit (image memory) 408 storing data of the colors in the image forming apparatus, according to the profile data shown in FIGS. 7A to 7D. FIGS. 9A to 9D are diagrams showing states of laser scanning performed by the image forming unit 401 of the image forming apparatus based on the read-out data of the colors shown in FIGS. 8A to 8D. FIG. 10 is a view showing a state of an image formed on a sheet. At this time, around pixel shift points, steps appear between the C plane, the M plane, the Y plane, and the K plane due to the steps of pixel shifts. This causes a moire.

Figure 11:
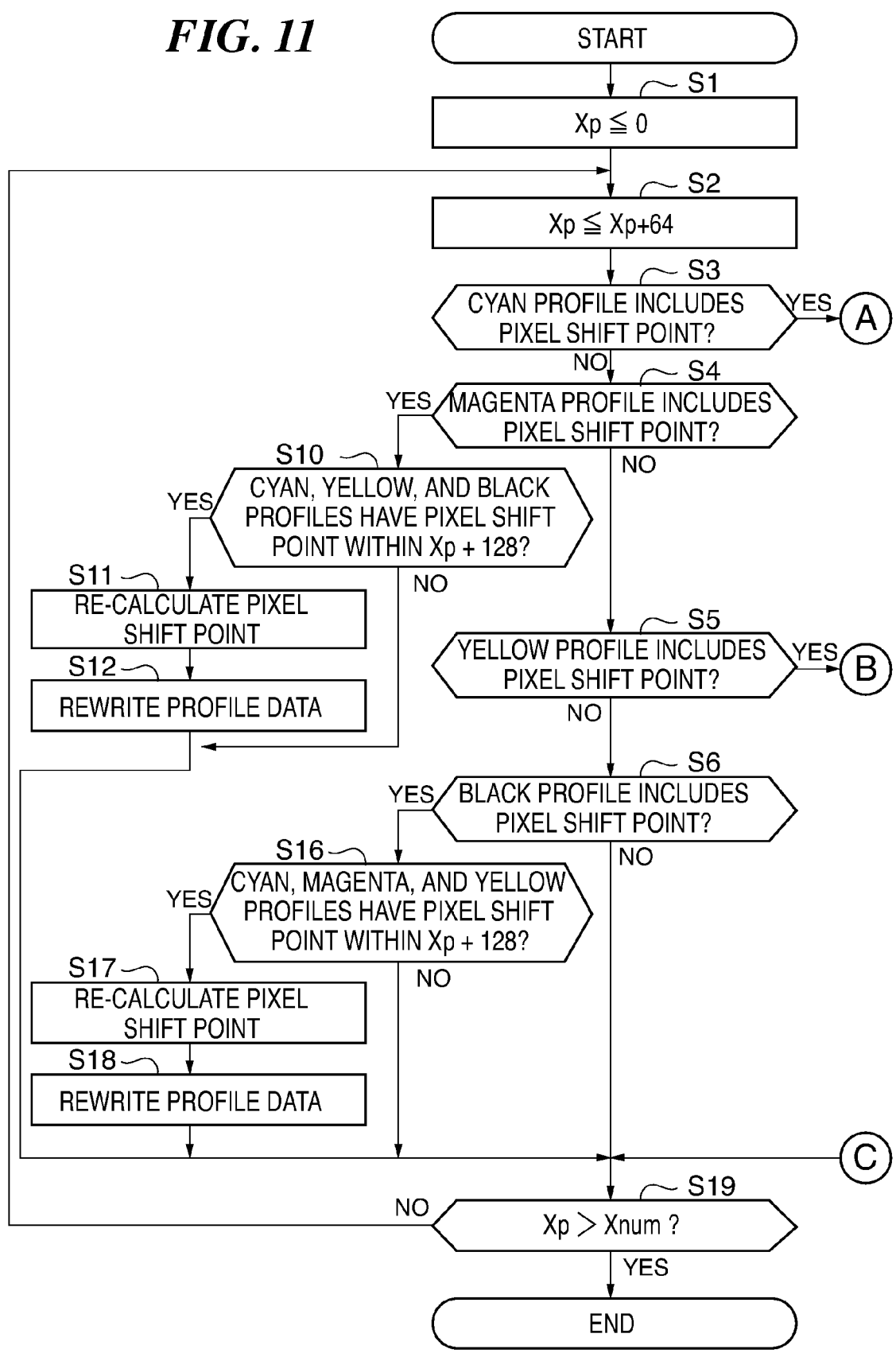
FIG. 11 is a flowchart of a profile data regeneration process.
Figure 12:
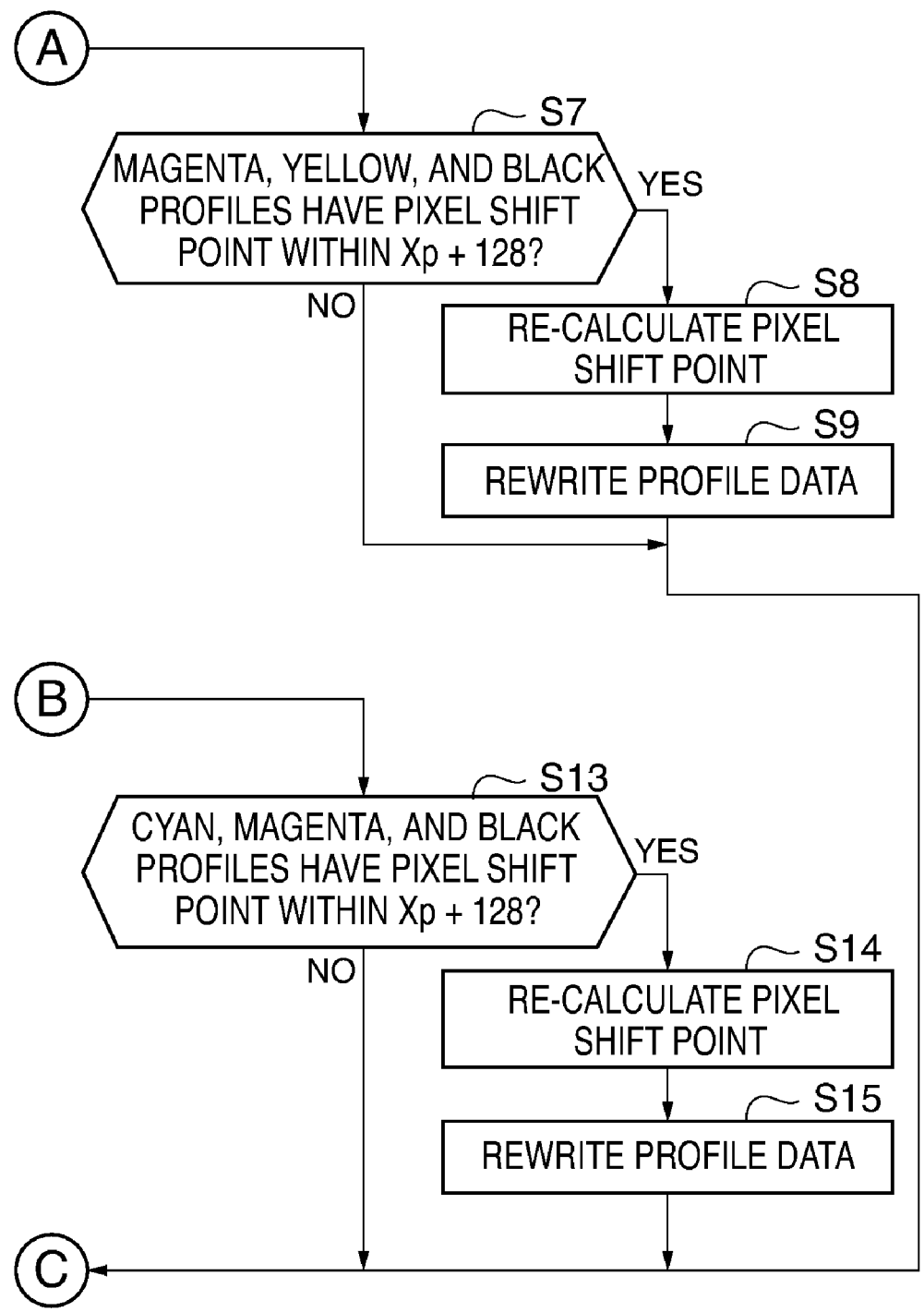
FIG. 12 is a continuation of the flowchart of FIG. 11.
Figure 14A:
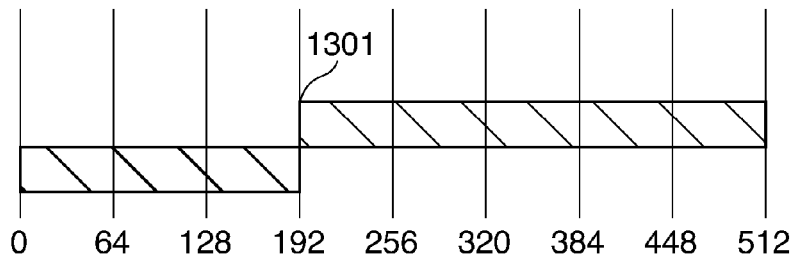
FIGS. 14A to 14D are diagrams useful in explaining how data of colors are read from the second storage unit (image memory) of the image forming apparatus which stores the data of the colors, according to the regenerated profile data (see FIGS. 13A to 13D).
Figure 14B:
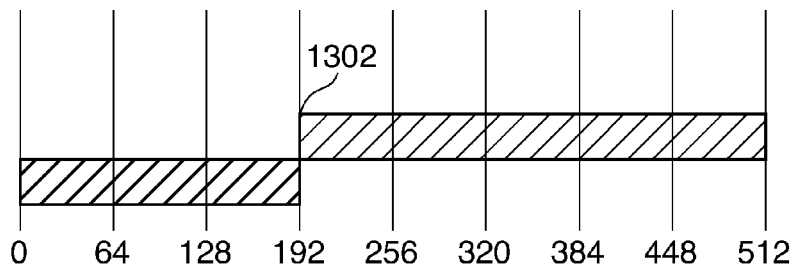
Figure 14C:
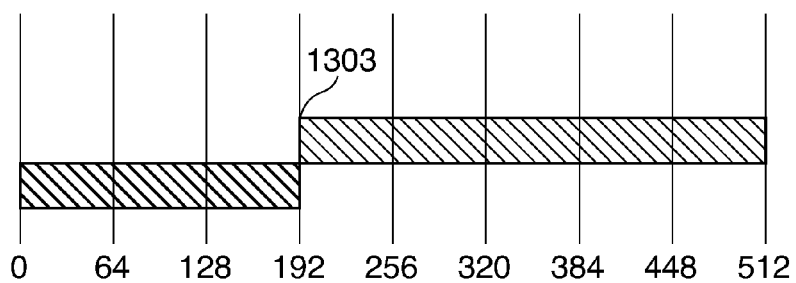
Figure 14D:
Figure 17A:
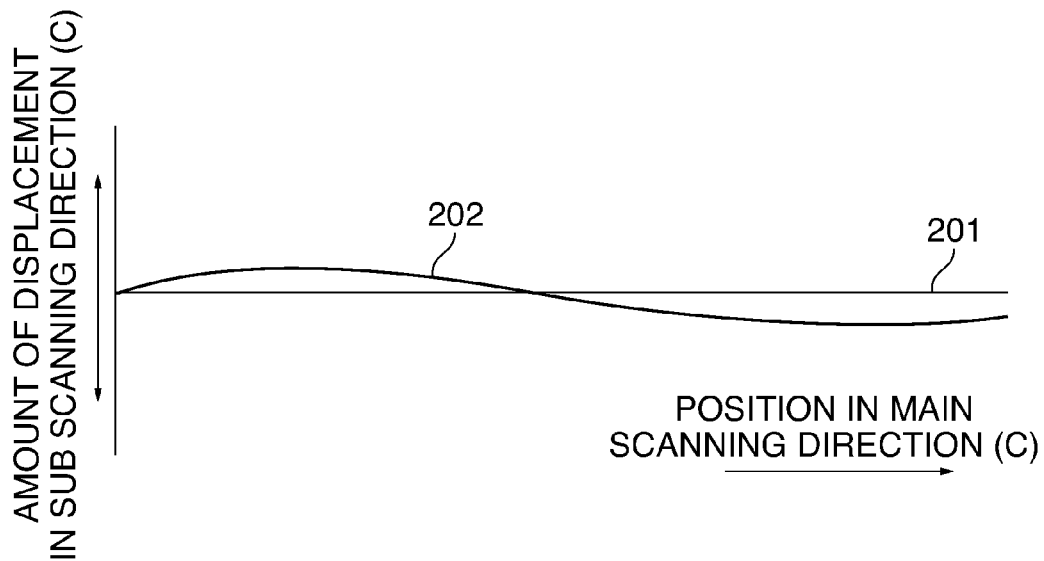
FIGS. 17A to 17D are graphs showing examples of profiles in a conventional image forming apparatus.
Figure 17B:
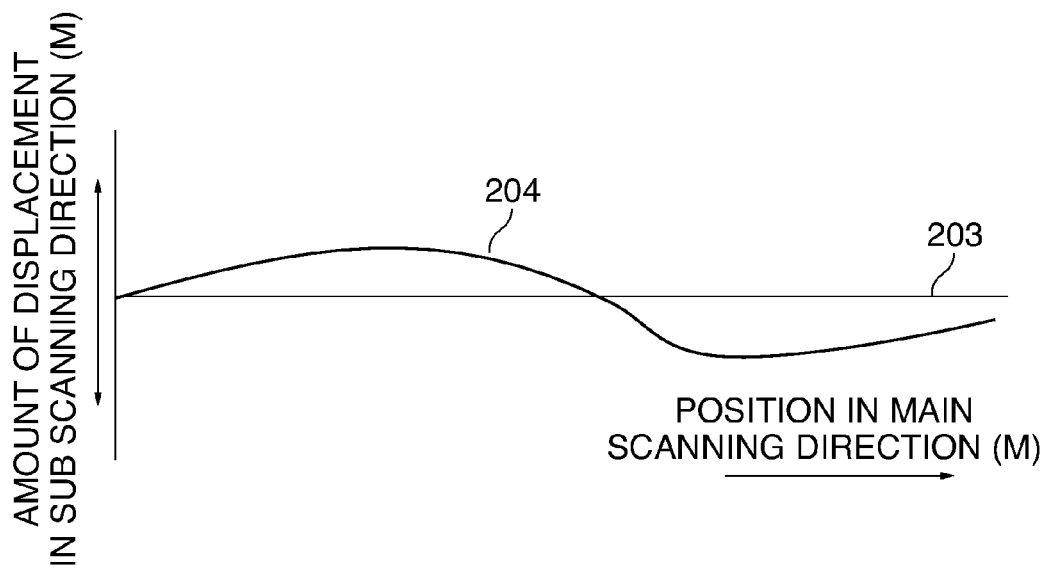
Figure 17C:
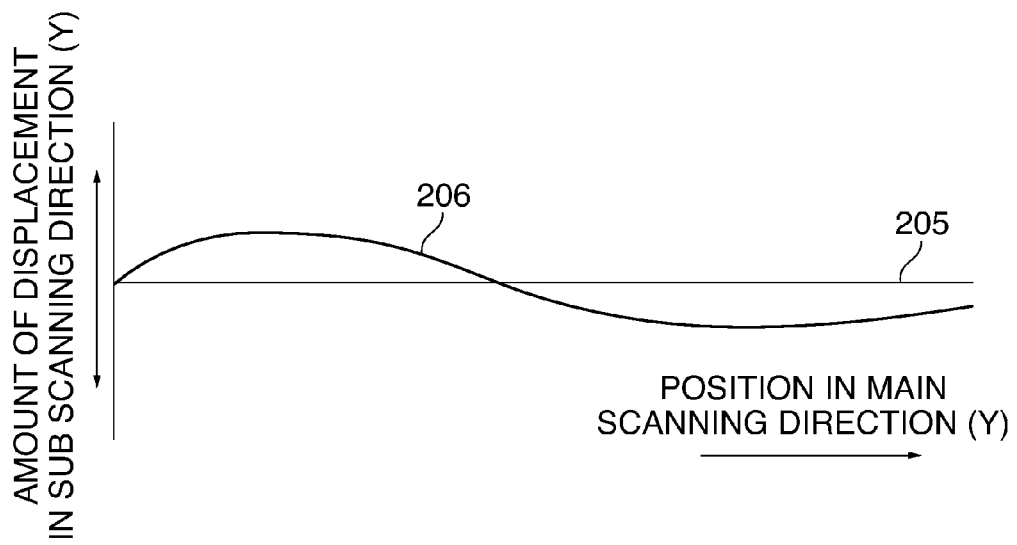
Figure 17D:
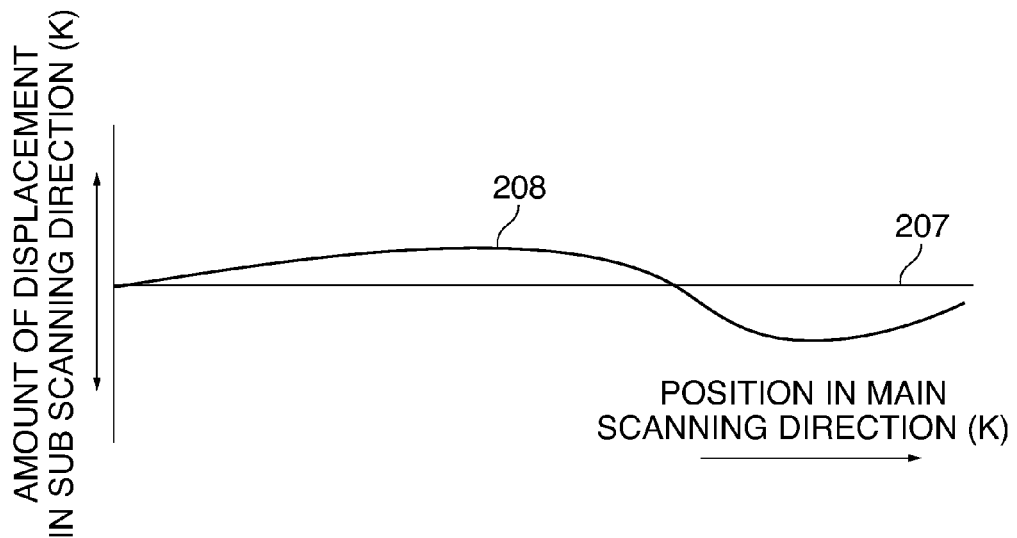
Figure 18A:
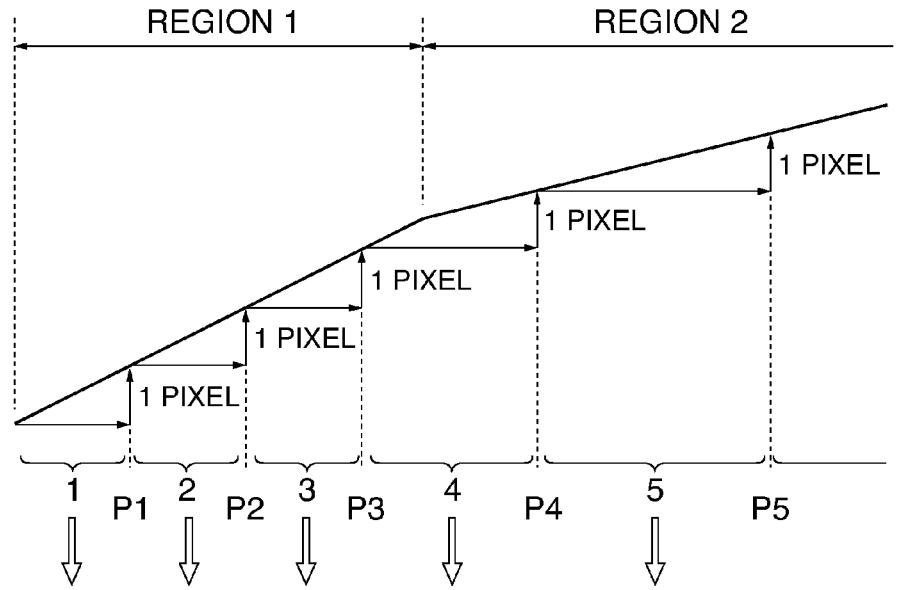
FIGS. 18A to 18C are diagrams useful in explaining pixel-by-pixel correction.
Figure 18B:
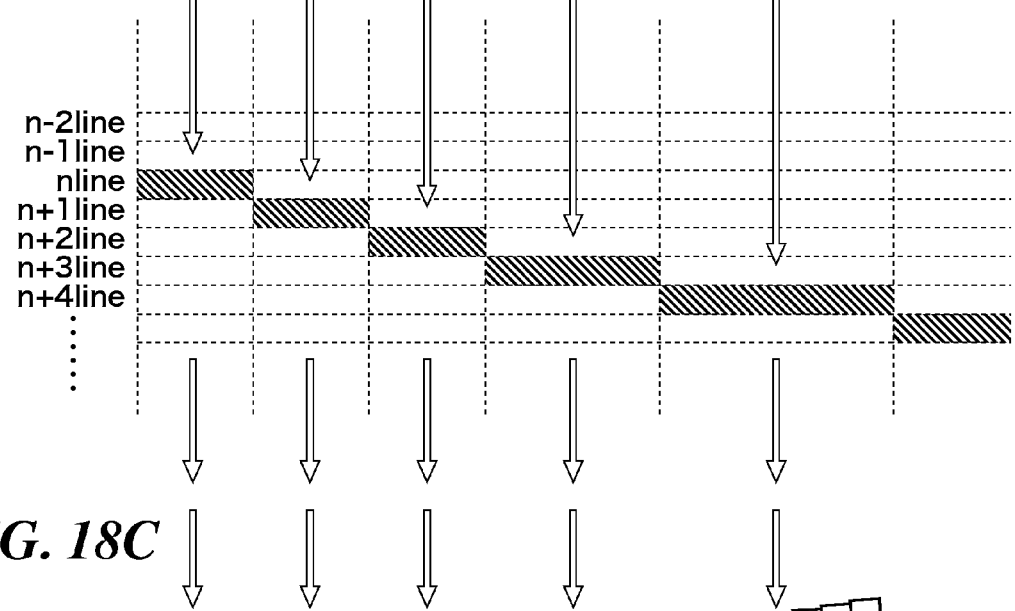
Figure 18C:
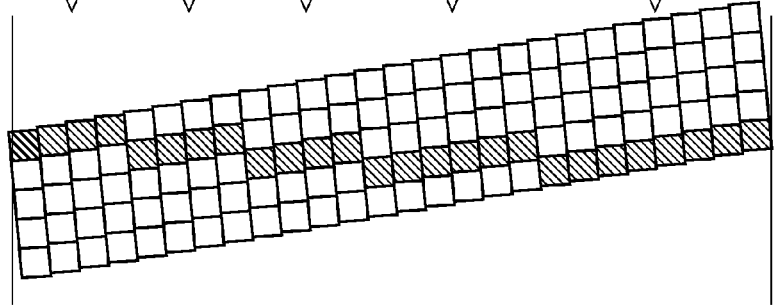
Figure 19A:
FIGS. 19A to 19E are diagrams useful in explaining less-than pixel correction.
Figure 19B:
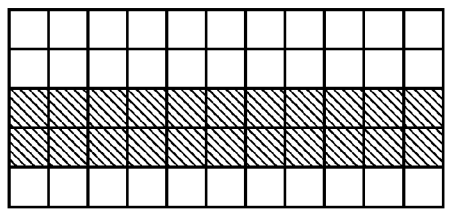
Figure 19C:
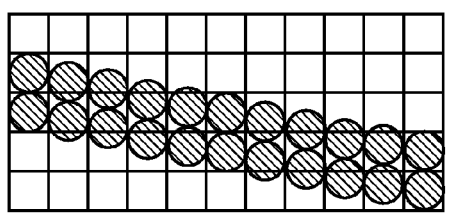
Figure 19D:
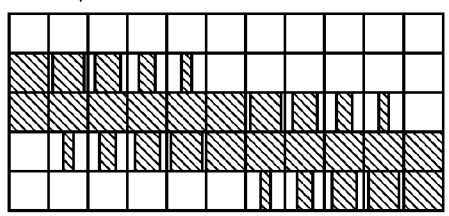
Figure 19E:
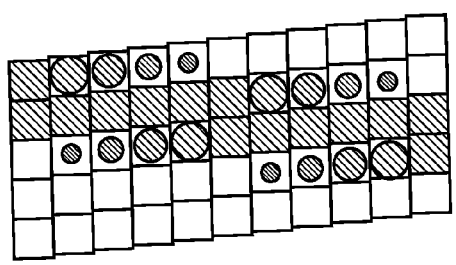

According to the present embodiment, profile data is corrected (regenerated) so as to suppress a moire caused by the presence of pixel shift points. FIGS. 11 and 12 are a flowchart of a profile data regeneration process. A program for this process is stored in a storage medium incorporated in a controller (not shown) in the image forming apparatus, and the program is executed by the controller. In the present embodiment, it is assumed that intervals of pixels in a direction corresponding to the main scanning direction at which pixel shift points are defined by units of 64 pixels, and the amount of shift of a pixel shift point in the main scanning direction in regenerating profile data is set to ±64 pixels.

First, the controller in the image forming apparatus sets a main-scanning pixel (a pixel in the main scanning direction) Xp to an initial value of 0 (step S1). Then, the controller adds a value of 64 to the main-scanning pixel Xp (step S2). Further, the controller determines whether or not a pixel shift point exists in the cyan (C) profile data (see FIG. 7A) at the main-scanning pixel Xp having the value of 64 added thereto (step S3). If no pixel shift point exists, the controller determines whether or not a pixel shift point exists in the magenta (M) profile data (see FIG. 7B) (step S4). If no pixel shift point exists, the controller determines whether or not a pixel shift point exists in the yellow (Y) profile data (see FIG. 7C) (step S5). If no pixel shift point exists, the controller determines whether or not a pixel shift point exists in the black (K) profile data (see FIG. 7D) (step S6). If no pixel shift point exists, the controller determines whether or not the main-scanning pixel Xp has exceeded a main-scanning pixel Xnum which is largest (step S19). If the main-scanning pixel Xp has not exceeded the largest main-scanning pixel Xnum, the process returns to the step S2, whereas if the main-scanning pixel Xp has exceeded the largest main-scanning pixel Xnum, the controller terminates the present process.

On the other hand, if it is determined in the step S3 that a pixel shift point exists in the C profile data (see FIG. 7A), it is detected whether or not each of the other profile data associated with the other colors (M, Y, K) has a pixel shift point present within a 128-pixel range from the cyan (C) pixel in the main scanning direction position of (step S7). If no pixel shift point exists within the 128-pixel range, the process proceeds to the step S19. On the other hand, if any pixel shift point(s) exist(s) within the 128-pixel range, an intermediate point between the detected pixel shift point(s) and the pixel shift point in the C profile data is calculated to obtain its value (step S8). Then, the color-specific profile data of each color is rewritten using the value (step S9). Thereafter, the process proceeds to the step S19.

Similarly, if it is determined in the step S4 that a pixel shift point exists in the M profile data (see FIG. 7B), it is detected whether or not each of the other profile data associated with the other colors (C, Y, K) has a pixel shift point present within a 128-pixel range from the magenta (M) pixel in the main scanning direction position (step S10). If no pixel shift point exists within the 128-pixel range, the process proceeds to the step S19. On the other hand, if any pixel shift point(s) exist(s) within the 128-pixel range, an intermediate point between the detected pixel shift point(s) and the pixel shift point in the M profile data is calculated to obtain its value (step S1). Then, the color-specific profile data of each color is rewritten using the value (step S12). Thereafter, the process proceeds to the step S19.

Similarly, if it is determined in the step S5 that a pixel shift point exists in the Y profile data (see FIG. 7C), it is detected whether or not each of the other profile data associated with the other colors (C, M, K) has a pixel shift point present within a 128-pixel range from the yellow (Y) pixel in the main scanning direction position (step S13). If no pixel shift point exists within the 128-pixel range, the process proceeds to the step S19. On the other hand, if any pixel shift point(s) exist(s) within the 128-pixel range, an intermediate point between the detected pixel shift point(s) and the pixel shift point in the Y profile data is calculated to obtain its value (step S14). Then, the color-specific profile data of each color is rewritten using the value (step S15). Thereafter, the process proceeds to the step S19.

Similarly, if it is determined in the step S6 that a pixel shift point exists in the K profile data (see FIG. 7D), it is detected whether or not each of the other profile data associated with the other colors (C, M, Y) has a pixel shift point present within a 128-pixel range from the black (B) pixel in the main scanning direction (step S16). If no pixel shift point exists within the 128-pixel range, the process proceeds to the step S19. On the other hand, if any pixel shift point(s) exist(s) within the 128-pixel range, an intermediate point between the detected pixel shift(s) point and the pixel shift point in the B profile data is calculated to obtain its value (step S17). Then, the color-specific profile data of each color is rewritten using the value (step S18). Thereafter, the process proceeds to the step S19.

Now, an example of profile data regeneration will be described with reference to FIGS. 7A to 7D. The controller in the image forming apparatus sequentially reads the profile data (see FIGS. 7A to 7D) stored in the profile storage unit 403 in order from profile data having a smallest numerical value assigned to a "main scanning pixel" item thereof first (S3, S4, S5, S6). In the present embodiment, first, it is found that a first pixel shift point P1 in the M profile data shown in FIG. 7B corresponding to the 128th pixel (S4). Next, the controller detects whether or not a pixel shift point exists within the 128-pixel range in the main scanning direction in each of the other profile data of the other colors (S10). Here, it is detected that in the Y profile data shown in FIG. 7C, pixel shift is performed in the same direction at its first pixel shift point P1 which is 64 pixels from the pixel shift point P1 of the magenta (M) in FIG. 7B. Further, it is detected that in the C profile data shown in FIG. 7A, pixel shift is performed in the same direction at its first pixel shift point P1 which is 128 pixels from the pixel shift point P1 of the magenta (M) appearing in FIG. 7B.

Then, an intermediate point between the pixel shift points associated with the respective three colors is calculated (S11) to thereby obtain its value. In the present embodiment, since the main scanning pixel in FIG. 7A is the "256th" pixel, the main scanning pixel in FIG. 7B the "128th" pixel, and the main scanning pixel in FIG. 7C the "192nd" pixel, the "192nd" pixel is set as the intermediate point. The profile data corresponding to FIGS. 7A, 7B, and 7C are rewritten as shown in FIGS. 13A to 13D (S12). FIGS. 13A to 13D are diagrams showing regenerated profile data. In each of the regenerated profile data shown in FIGS. 13A, 13B, and 13C, the main scanning pixel is set to the "192nd" pixel as the first pixel shift point P1. This processing is carried out up to a final pixel shift point set forth in the profile data (S19), followed by terminating the profile data regeneration process.

FIGS. 14A to 14D are diagrams useful in explaining how data of colors are read from the second storage unit (image memory) 408 storing the data of the colors in the image forming apparatus, according to the regenerated profile data shown in FIGS. 13A to 13D. By using the profile data shown in FIGS. 13A to 13D, image data is read out from the second storage unit 408, in respective forms shown in FIGS. 14A to 14D. FIGS. 15A to 15D are diagrams showing states of laser scanning performed by the image forming unit 401 of the image forming apparatus based on read-out data of colors as shown in FIGS. 14A to 14D. FIG. 16 is a view showing a state of an image formed on a sheet.

According to the image forming apparatus of the present embodiment, the above-described method makes it possible to eliminate color misregistration between cyan, magenta, and yellow to thereby suppress occurrence of color moire between the three colors. Further, the method makes it possible to acquire profile data promptly. Furthermore, only when pixel shift points of colors are in a positional relationship that makes color moire easy to occur, profile data can be regenerated to thereby suppress occurrence of color moire. What is more, it is possible to prevent occurrence of displacements between the color images at positions corresponding to the respective pixel shift points to thereby suppress occurrence of color moire. In addition, since the position of pixel shift points of the respective colors is changed to an intermediate point between the pixel shift points, it is possible to reduce the amount of change of the color-specific profile data.

In the above-described embodiment, profile data describing pixel shift points and supplied to the controller that executes pixel shift control is quantized in units of 64 bits, as described hereinbefore. Therefore, the profile data does not accurately represent curves of a laser beam distorted in an analog manner, i.e. an intrinsic profile. Consequently, it is judged that even if the profile data is shifted (corrected) within a narrow region in the main scanning direction, i.e. pixel shift points are moved, no particular problem occurs.

In the present embodiment, when it is determined, by referring to profile data of the four colors, that the predetermined condition is satisfied, the profile data are regenerated. However, it is not necessarily required to regenerate profile data associated with a color (e.g. yellow) which does not cause a moire or the like even when a step is produced between the color and another color at a pixel shift point.

Further, although in the present embodiment, the amount of shift of a pixel shift point for regeneration is set to ±64 pixels, it is possible to change the shift amount according to the kind of an image, such as a text image or a photographic image.

It should be noted that the present invention is not limited to the arrangement of the above-described embodiment, but any suitable arrangement may be employed insofar as it can attain the functions recited in claims or those of the embodiment.

For example, although in the above-described embodiment, an intermediate point between pixel shift points associated with at least two colors is calculated and profile data are regenerated such that the pixel shift points are changed to the intermediate point, this method is not limitative. The pixel shift points may be changed not only to an intermediate point between pixel shift points associated with a plurality of colors, but also to any point insofar as it is between a maximum value and a minimum value of the main scanning positions of respective pixel shift points within a predetermined pixel range. Further, profile data may be regenerated such that a pixel shift point of a certain color is changed to a pixel shift point of another color. This makes it possible to reduce the number of profile data items to be changed by at least one data item.

The present invention may be applied to a system comprising a plurality of apparatuses or a unit formed by a single apparatus. Further, it is to be understood that the image forming apparatus can be applied not only to a printer originally intended as such, but also to a facsimile machine having a printing function, or a multifunction peripheral (MFP) having a printing function, a copying function, a scanner function, etc.

In the above-described embodiment, the image forming apparatus is described, by way of example, which is configured to use the intermediate transfer member and sequentially transfer toner images in the respective colors onto the intermediate transfer member in superimposed relation, whereafter the full-color toner image carried by the intermediate transfer member is transferred onto a recording medium at one time. However, this transfer method is not limitative, but the image forming apparatus may be configured to use a recording medium carrier and sequentially transfer toner images of the respective colors onto the recording medium carrier in superimposed relation.

Further, it is to be understood that the shapes and relative arrangement of the component elements in the above-described embodiment can be modified, as deemed appropriate, according to the arrangement of an apparatus to which the present invention is applied and various conditions, and hence do not limit the scope of the present invention.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2007-264755 filed Oct. 10, 2007, which is hereby incorporated by reference herein in its entirety.

What is claimed is:

1. An image forming apparatus comprising:
    an image storage unit adapted to store image data associated with at least two colors;
    a reading unit adapted to read out the stored image data of each color while designating a reading position in a sub scanning direction of the image data;
    a transfer unit adapted to transfer a color image onto a recording medium based on the read-out image data of each color;
    a switching unit adapted to switch the reading position in the sub scanning direction of the image data of each color according to curve correction information of each color defined based on position curve information in a main scanning direction of said transfer unit, when said reading unit reads out the image data; and
    a switching position changing unit adapted to change a switching position of the each color such that the switching positions are aligned when the switching position in the main scanning direction of the each color corresponding to the switched reading position of the each color is within a predetermined pixel range.

2. The image forming apparatus according to claim 1, comprising a curve correction information storage unit adapted to store the curve correction information of each color, and
    wherein said reading unit reads out the curve correction information of each color from said curve correction information storage unit in accordance with reading of the image data, and
    wherein said switching unit switches the reading position in the sub scanning direction of the image data of each color according to the read-out curve correction information of each color.

3. The image forming apparatus according to claim 1, wherein said switching position changing unit changes the switching position of each color to an intermediate point between the switching positions of the colors before being changed.

4. The image forming apparatus according to claim 1, wherein said switching position changing unit changes the switching position associated with a specific color such that the switching position is aligned with the switching position associated with a color different from the specific color.

5. An image forming method for an image forming apparatus including an image storage unit adapted to store image data associated with at least two colors, a reading unit adapted to read out the stored image data of each color while designating a reading position in the sub scanning direction of the image data, and a transfer unit adapted to transfer a color image onto a recording medium based on the read-out image data of each color, comprising:
    switching the reading position in the sub scanning direction of the image data of each color according to curve correction information of each color defined based on position curve information in a main scanning direction of the transfer unit, when the reading unit reads out the image data; and
    changing a switching position of the each color such that the switching position are aligned when the switching position in the main scanning direction of the each color corresponding to the switched reading position of the each color is within a predetermined pixel range.

* * * * *